(12) United States Patent
Ting et al.

(10) Patent No.: US 8,692,967 B2
(45) Date of Patent: Apr. 8, 2014

(54) PIXEL ARRAY, POLYMER STABILIZED ALIGNMENT LIQUID CRYSTAL DISPLAY PANEL, AND ELECTRO-OPTICAL APPARATUS

(75) Inventors: Tien-Lun Ting, Taichung (TW);
Yu-Ching Wu, Kaohsiung (TW);
Yi-Cheng Li, Taipei County (TW);
Wen-Hao Hsu, Hsinchu County (TW);
Jenn-Jia Su, Chiayi County (TW)

(73) Assignee: Au Optronics Corporation, Hsinchu (TW)

( * ) Notice: Subject to any disclaimer, the term of this patent is extended or adjusted under 35 U.S.C. 154(b) by 606 days.

(21) Appl. No.: 12/844,837

(22) Filed: Jul. 28, 2010

(65) Prior Publication Data

US 2011/0156993 A1 Jun. 30, 2011

(30) Foreign Application Priority Data

Dec. 30, 2009 (TW) .............................. 98145808 A
Jun. 24, 2010 (TW) .............................. 99120614 A

(51) Int. Cl.
*G02F 1/1343* (2006.01)
(52) U.S. Cl.
USPC .................. 349/144; 349/48; 257/59; 257/72

(58) Field of Classification Search
USPC .................... 349/48, 144, 129; 257/59, 72; 313/498–512
See application file for complete search history.

(56) References Cited

U.S. PATENT DOCUMENTS

| | | | |
|---|---|---|---|
| 6,850,302 B2 | 2/2005 | Song | |
| 7,206,048 B2 | 4/2007 | Song | |
| 7,612,839 B2 * | 11/2009 | Hisada | 349/48 |
| 7,834,949 B2 * | 11/2010 | Tasaka et al. | 349/48 |
| 8,223,290 B2 * | 7/2012 | Lee et al. | 349/48 |
| 8,325,286 B2 * | 12/2012 | Hisada | 349/48 |
| 2008/0043162 A1 * | 2/2008 | Tung et al. | 349/40 |

* cited by examiner

*Primary Examiner* — Michael Caley
*Assistant Examiner* — Kendrick Hsu
(74) *Attorney, Agent, or Firm* — Jianq Chyun IP Office

(57) ABSTRACT

A pixel array including a plurality of scan lines, a plurality of data lines, and a plurality of sub-pixel is provided. Each of the sub-pixel arranged in the $n^{th}$ row includes a first switch, a second switch, a first pixel electrode, a second pixel electrode, and a third switch, wherein the first switch and the second switch are electrically connected to the $n^{th}$ scan line and the $m^{th}$ data line, the first pixel electrode is electrically connected to the first switch, the second pixel electrode is electrically connected to a signal output terminal of the second switch. The first pixel electrode has a first aperture above the signal output terminal. The third switch is electrically connected to the $(n+1)^{th}$ scan line and the second pixel electrode, and the second pixel electrode has a second aperture above a floating terminal of the third switch.

24 Claims, 12 Drawing Sheets

PIXEL ARRAY, POLYMER STABILIZED ALIGNMENT LIQUID CRYSTAL DISPLAY PANEL, AND ELECTRO-OPTICAL APPARATUS

This application claims the priority benefit of Taiwan application serial no. 98145808, filed on Dec. 30, 2009 and Taiwan application serial no. 99120614, filed on Jun. 24, 2010. The entirety of each of the above-mentioned patent applications is hereby incorporated by reference herein and made a part of this specification.

BACKGROUND OF THE INVENTION

1. Field of the Invention

The present invention is related to a pixel array, and more particular to a pixel array having a relatively better display quality.

2. Description of Related Art

With the continuous advancement of the liquid crystal display device towards to the large-size display standard, the wide viewing angle techniques of the liquid crystal display panel are continuously developed in order to overcome the viewing angle problem of the large-size display device. Among the wide viewing angle techniques, the multi-domain vertical alignment (MVA) liquid crystal display panel and the polymer stabilized alignment (PSA) liquid crystal display panel are the most common wide viewing angle techniques. To improve the color washout problem of the liquid crystal display panel, the advanced-MVA liquid crystal display panel is disclosed. In the technique of the advanced-MVA liquid crystal display panel, each of the sub-pixel regions is divided into a main display region and a sub-display region. By using the adequate circuit design or the adequate driving method, the main display region and the sub-display region in the same sub-pixel region respectively have different bias voltages. Thus, the color washout problem can be overcome. In the current technique, the concept that each of the sub-pixel regions is divided into a main display region and a sub-display region is applied into the technique of the polymer stabilized alignment liquid crystal display panel.

FIG. 1 is an equivalent circuit diagram of a pixel array and FIG. 2 is a schematic view of a single sub-pixel shown in FIG. 1. As shown in FIG. 1 and FIG. 2, a pixel array 100 comprises a plurality of sub-pixels P1, and each of the sub-pixels P1 comprises a first thin film transistor TFT1, a second thin film transistor TFT2, a third thin film transistor TFT3, a first pixel electrode ITO1 electrically connected to the first thin film transistor TFT1, a second pixel electrode ITO2 electrically connected to the second thin film transistor ITO2. The first pixel electrode ITO1 is coupled to a common line COM1 to form a first storage capacitor Cs1. Further, the first pixel electrode ITO1 is coupled to a common electrode (not labeled) on the opposed substrate (such as the color filter substrate) to form a first liquid crystal capacitor CLC1. Similarly, the second pixel electrode ITO2 is coupled to a common line COM2 to form a second storage capacitor Cs2. Further, the second pixel electrode ITO2 is coupled to a common electrode (not labeled) on the opposed substrate (such as the color filter substrate) to form a second liquid crystal capacitor CLC2.

As shown in FIG. 1 and FIG. 2, in the sub-pixel P1 electrically connected to the scan line SL(n−1), the gates G1 and G2 of the first thin film transistor TFT 1 and the second thin film transistor TFT2 are electrically connected to the scan line SL(n−11) and the gate G3 of the third thin film transistor TFT3 is electrically connected to the next scan line SL(n).

Moreover, the source S3 of the third thin film transistor TFT3 is electrically connected to the second pixel electrode ITO2 and the drain D3 of the third thin film transistor TFT3 is coupled to the first pixel electrode ITO1 to form a first capacitor Ccs-a. Furthermore, the drain D3 of the third thin film transistor TFT3 is coupled to the common line COM1 under the first pixel electrode ITO1 to form a second capacitor Ccs-b. When a high voltage (Vgh) is applied onto the scan line SL(n−1), the image data is written into the sub-pixel through the data lines DL(m−1) and DL(m), wherein the sub-pixel is connected to the scan line SL(n−1). Meanwhile, the first pixel electrode ITO1 and the second pixel electrode ITO2 are at the same voltage level. Then, when a high voltage is applied onto the scan line SL(n), the first capacitor Ccs-a and the second capacitor Ccs-b lead to that the first pixel electrode ITO1 and the second pixel electrode ITO2 are at different voltage levels.

Since the drain D2 of the second thin film transistor TFT2 crosses over the first pixel electrode ITO1 so as to be connected to the second pixel electrode ITO2, a parasitic capacitance Cx1 is generated between the drain D2 of the second thin film transistor TFT2 and the first pixel electrode ITO1. Moreover, since the drain D3 of the third thin film transistor TFT3 crosses over the second pixel electrode ITO2, a parasitic capacitance Cx2 is generated between the drain D3 of the third thin film transistor TFT2 and the second pixel electrode ITO2. The parasitic capacitances Cx1 and Cx2 decrease the increasing of the voltage difference between the first pixel electrode ITO1 and the second pixel electrode ITO2. Thus, the color washout problem cannot be effectively improved. Hence, how to prevent the display quality from being affected by the parasitic capacitances Cx1 and Cx2 in the sub-pixel P1 is one of the important issues should be overcome.

SUMMARY OF THE INVENTION

The present invention provides a pixel array, a polymer stabilized alignment liquid crystal display panel (PSA-LCD panel) and an electro-optical apparatus which are capable of providing a relatively better display quality.

The present invention provides a pixel array including a plurality of scan lines, a plurality of data lines and a plurality of sub-pixels. The data lines are intersected with the scan lines to define a plurality of sub-pixel regions. The sub-pixels are disposed in the sub-pixel regions and each of the sub-pixels is electrically connected with one of the scan lines and one of the data lines. Each of the sub-pixels arranged in the nth row comprises a first switch, a second switch, a first pixel electrode, a second pixel electrode and a third switch. The first switch and the second switch are electrically connected to an nth scan line and an mth data line, and the second switch has a signal output terminal. The first pixel electrode is electrically connected to the first switch. The second pixel electrode is electrically connected to the signal output terminal of the second switch and the first pixel electrode has at least a first opening located above the signal output terminal. The third switch is electrically connected to an (n+1)th scan line and the second pixel electrode. The third switch has a floating terminal and the second pixel electrode has at least a second opening located above the floating terminal.

According to one embodiment of the present invention, the sub-pixels are arranged in a plurality of rows and the sub-pixels arranged in the nth row are electrically connected to the nth scan line and the (n+1)th scan line.

According to one embodiment of the present invention, the first pixel electrode and the second pixel electrode of the sub-pixels arranged in the nth row are located between the nth scan line and the (n+1)th scan line.

According to one embodiment of the present invention, each of the first switches arranged in the nth row is a first thin film transistor, and the first thin film transistor has a first gate electrically connect to the nth scan line, a first source electrically connected to one of the data lines, and a first drain electrically connected to the first pixel electrode.

According to one embodiment of the present invention, each of the second switches arranged in the nth row is a second thin film transistor, and the second thin film transistor has a second gate electrically connect to the nth scan line, a second source electrically connected to one of the data lines, and the signal output terminal.

According to one embodiment of the present invention, each of the third switches arranged in the nth row is a third thin film transistor, and the third thin film transistor has a third gate electrically connect to the (n+1)th scan line, a third source electrically connected to the second pixel electrode, and the floating terminal.

According to one embodiment of the present invention, the aforementioned floating terminal extends under the first pixel electrode.

According to one embodiment of the present invention, the pixel array further comprises a plurality of common lines electrically connected to one another and disposed under each of the first pixel electrodes and each of the second pixel electrodes.

According to one embodiment of the present invention, each of the common lines extends along a row direction, and a portion of the common lines disposed under the first pixel electrodes has at least a first branch located under the first openings, and a portion of the common lines disposed under the second pixel electrodes has at least a second branch located under the second openings.

According to one embodiment of the present invention, the second branch is located under the floating terminal.

According to one embodiment of the present invention, the floating terminals and the first pixel electrode of each sub-pixel are overlapped to form a first capacitor.

According to one embodiment of the present invention, the floating terminals and the first pixel electrode of each sub-pixel are overlapped to form a first capacitor while the floating terminals and the second branch of each sub-pixel are overlapped to form a second capacitor.

According to one embodiment of the present invention, the first capacitor and the second capacitor of each sub-pixel are not stacked one another.

According to one embodiment of the present invention, each of the first pixel electrodes includes a first electrode portion, a second electrode portion and a first connecting portion. The first connecting portion is located between the first electrode portion and the second electrode portion so that the first electrode portion and the second electrode portion are separated from each other by two first strip openings respectively located at two sides of the first connecting portion, wherein the first electrode portion is connected to the second electrode portion through the first connecting portion.

According to one embodiment of the present invention, a total area of the two first strip openings is A1, and a total overlapping area between the first pixel electrode and the signal output terminal is A2, and an aperture ratio A1/(A1+A2) is substantially larger than 91%.

According to one embodiment of the present invention, each of the second pixel electrodes includes a third electrode portion, a fourth electrode portion and a second connecting portion. The second connecting portion is located between the third electrode portion and the fourth electrode portion so that the third electrode portion and the fourth electrode portion are separated from each other by two second strip openings respectively located at two sides of the second connecting portion, wherein the third electrode portion is connected to the fourth electrode portion through the second connecting portion.

According to one embodiment of the present invention, a total area of the two second strip openings is A3, and a total overlapping area between the second pixel electrode and the floating terminal is A4, and an aperture ratio A3/(A3+A4) is substantially larger than 93%.

According to one embodiment of the present invention, each of the first pixel electrodes comprises a first electrode portion, a second electrode portion and a plurality of first connecting portions. The first connecting portions are located between the first electrode portion and the second electrode portion so that the first electrode portion and the second electrode portion are separated from each other by at least a first strip opening located between the first connecting portions, wherein the first electrode portion is connected to the second electrode portion through the first connecting portions.

According to one embodiment of the present invention, an area of the at least first strip opening is A1, and a total overlapping area between the first pixel electrode and the signal output terminal is A2, and an aperture ratio A1/(A1+A2) is substantially larger than 91%.

According to one embodiment of the present invention, each of the second pixel electrodes comprises a third electrode portion, a fourth electrode portion and a plurality of second connecting portions. The second connecting portions are located between the third electrode portion and the fourth electrode portion so that the third electrode portion and the fourth electrode portion are separated from each other by at least a second strip opening located between the second connecting portions, wherein the third electrode portion is connected to the fourth electrode portion through the second connecting portions.

According to one embodiment of the present invention, an area of the at least second strip opening is A3, and a total overlapping area between the second pixel electrode and the floating terminal is A4, and an aperture ratio A3/(A3+A4) is substantially larger than 93%.

The present invention further provides a polymer stabilized alignment liquid crystal display panel (PSA-LCD panel) which includes a first substrate, a second substrate, two polymer stabilized alignment layers and a liquid crystal layer. The first substrate has the aforementioned pixel array, and the second substrate is disposed above the first substrate. The two polymer stabilized alignment layers are disposed on the first substrate and the second substrate respectively. The liquid crystal layer is disposed between the two polymer stabilized alignment layers.

The present invention further provides an electro-optical apparatus including the aforementioned pixel array or the aforementioned polymer stabilized alignment liquid crystal display panel.

In the present invention, since the designs of the signal output terminal and the floating terminal in the sub-pixel are the opening designs, the parasitic capacitance between the first pixel electrode and the signal output terminal and the parasitic capacitance between the second pixel electrode and the floating terminal can be effectively decreased.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3' is a schematic view illustrating another pixel array according to a first embodiment of the invention.

FIG. 4' is a schematic view illustrating another layout of a pixel array according to the first embodiment of the invention.

FIG. 5' is a schematic view illustrating another pixel array according to a second embodiment of the invention.

FIG. 6' is a schematic view illustrating another layout of a pixel array according to a second embodiment of the invention.

DESCRIPTION OF EMBODIMENTS

The First Embodiment

Figure 1:
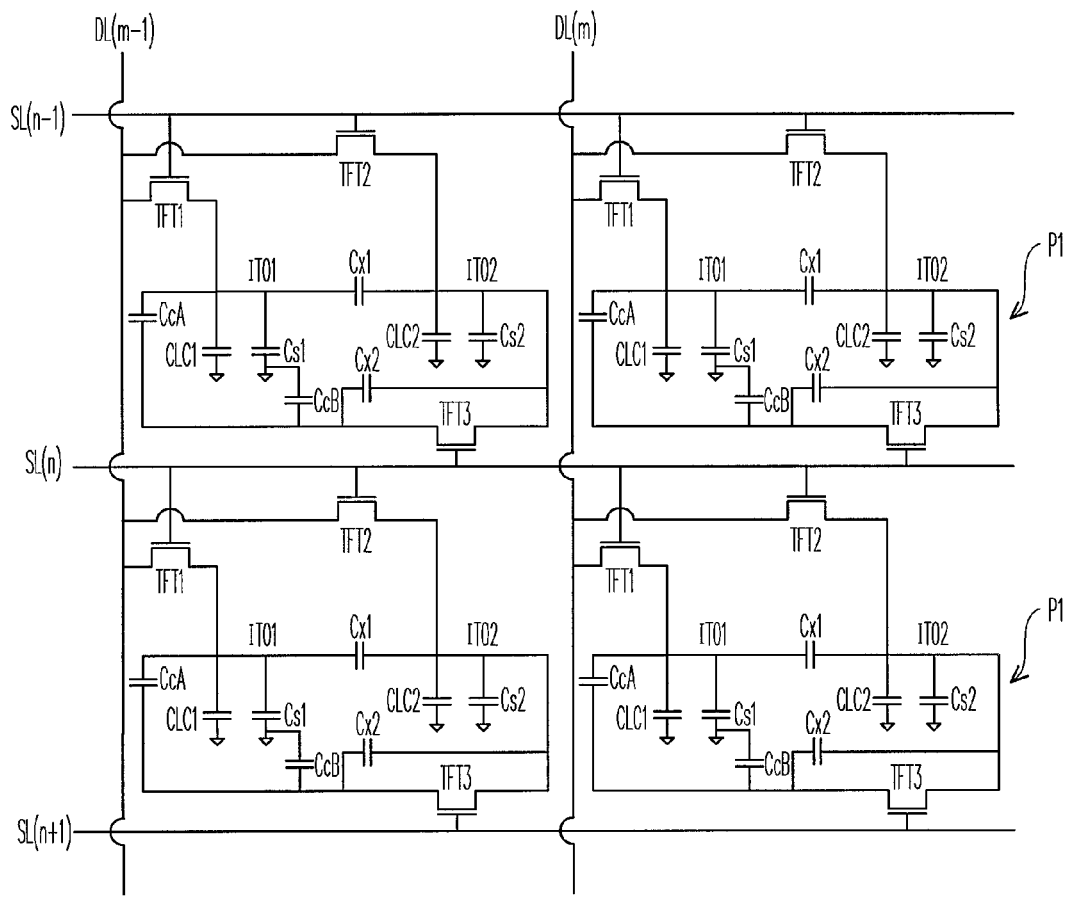
FIG. 1 is an equivalent circuit diagram of a pixel array.
Figure 2:
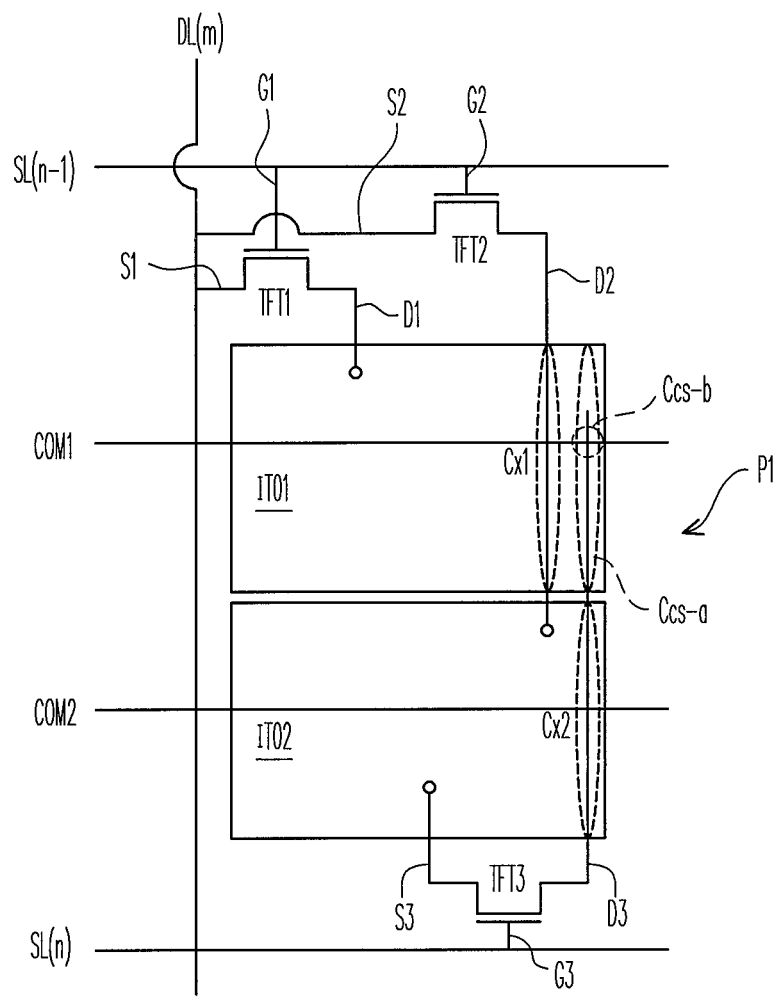
FIG. 2 is a schematic view of a single sub-pixel shown in FIG. 1.
Figure 3:
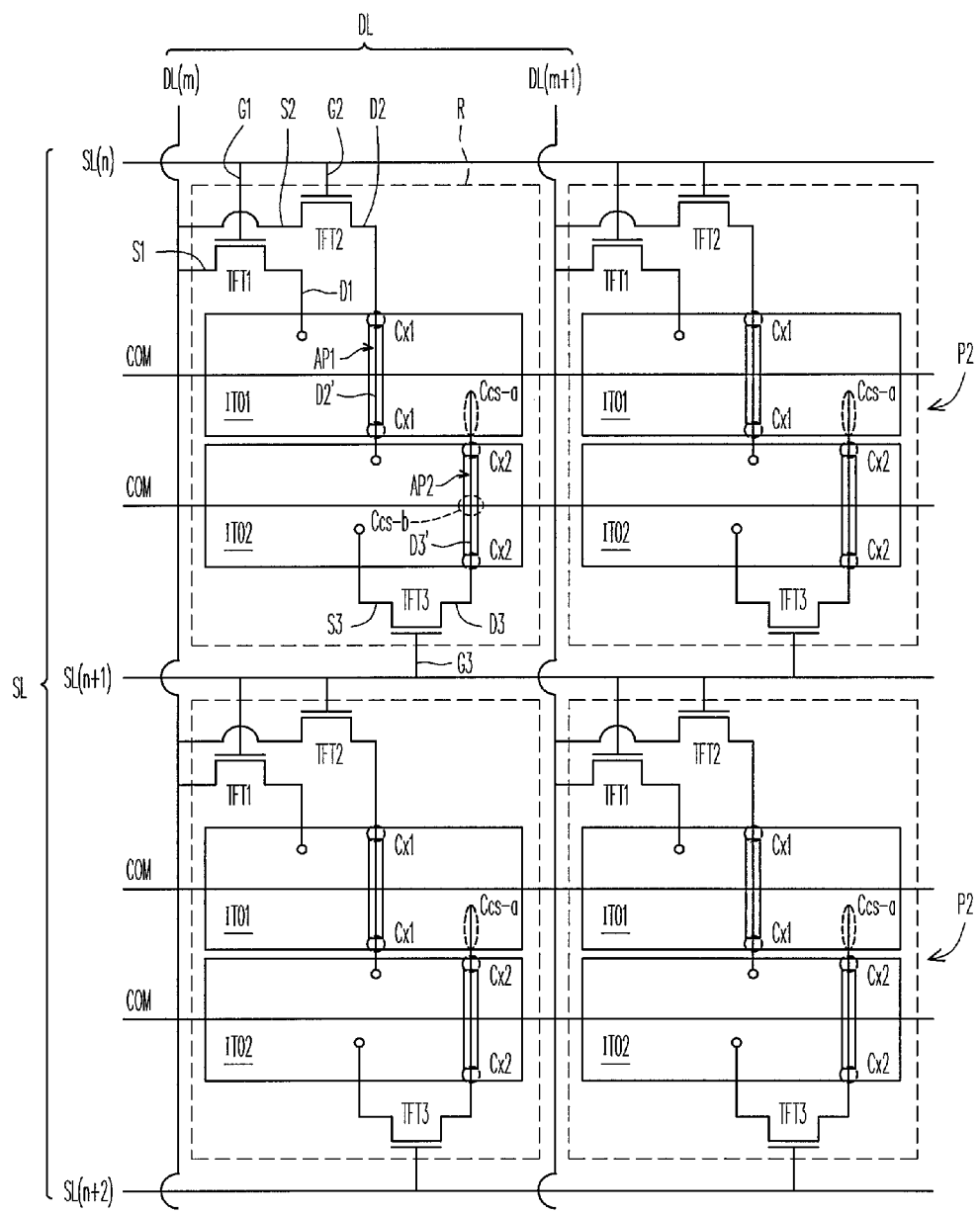
FIG. 3 is a schematic view illustrating a pixel array according to a first embodiment of the invention.
Figure 3:
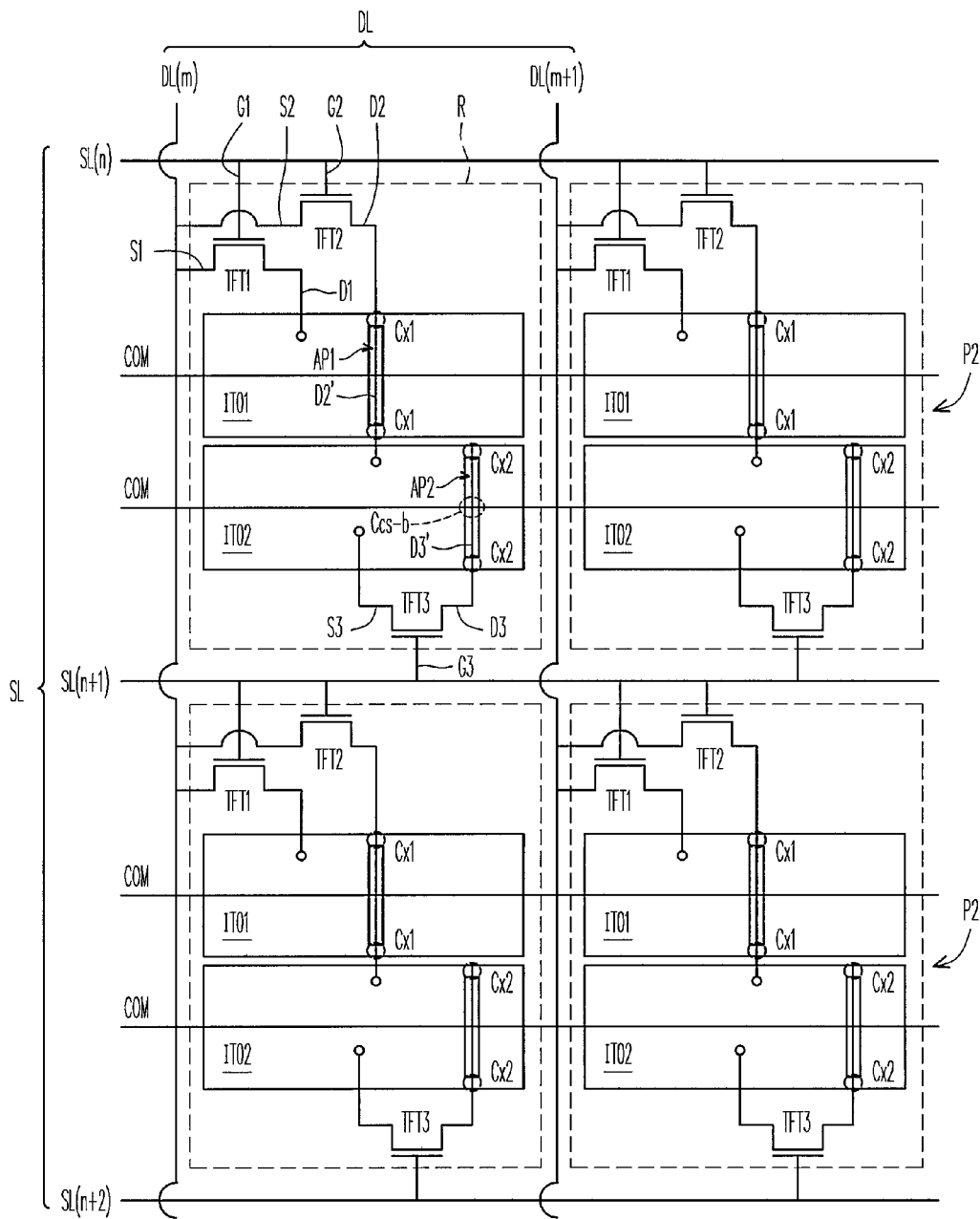
Figure 4:
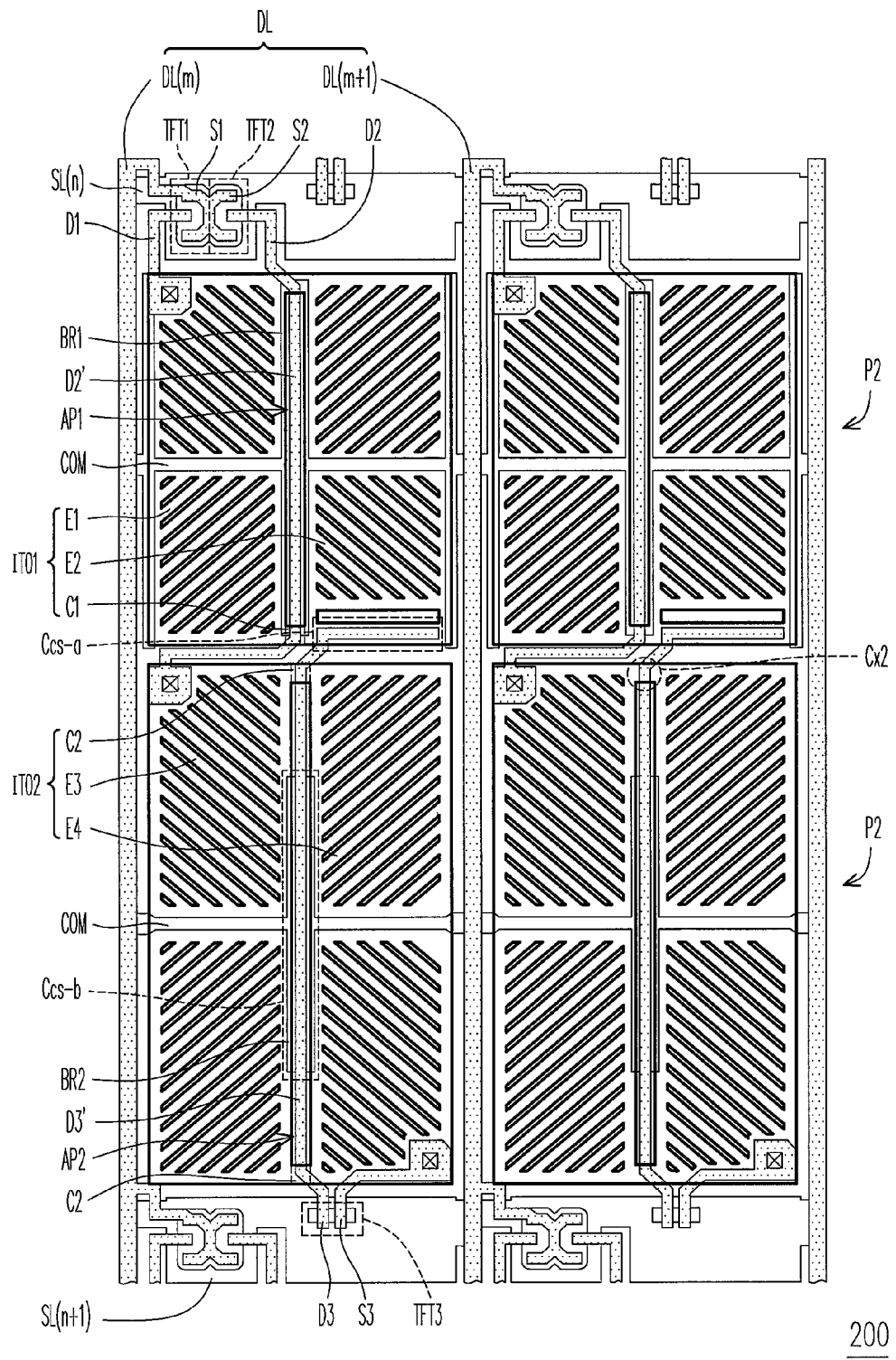
FIG. 4 is a schematic view illustrating a layout of a pixel array according to the first embodiment of the invention.
Figure 4:
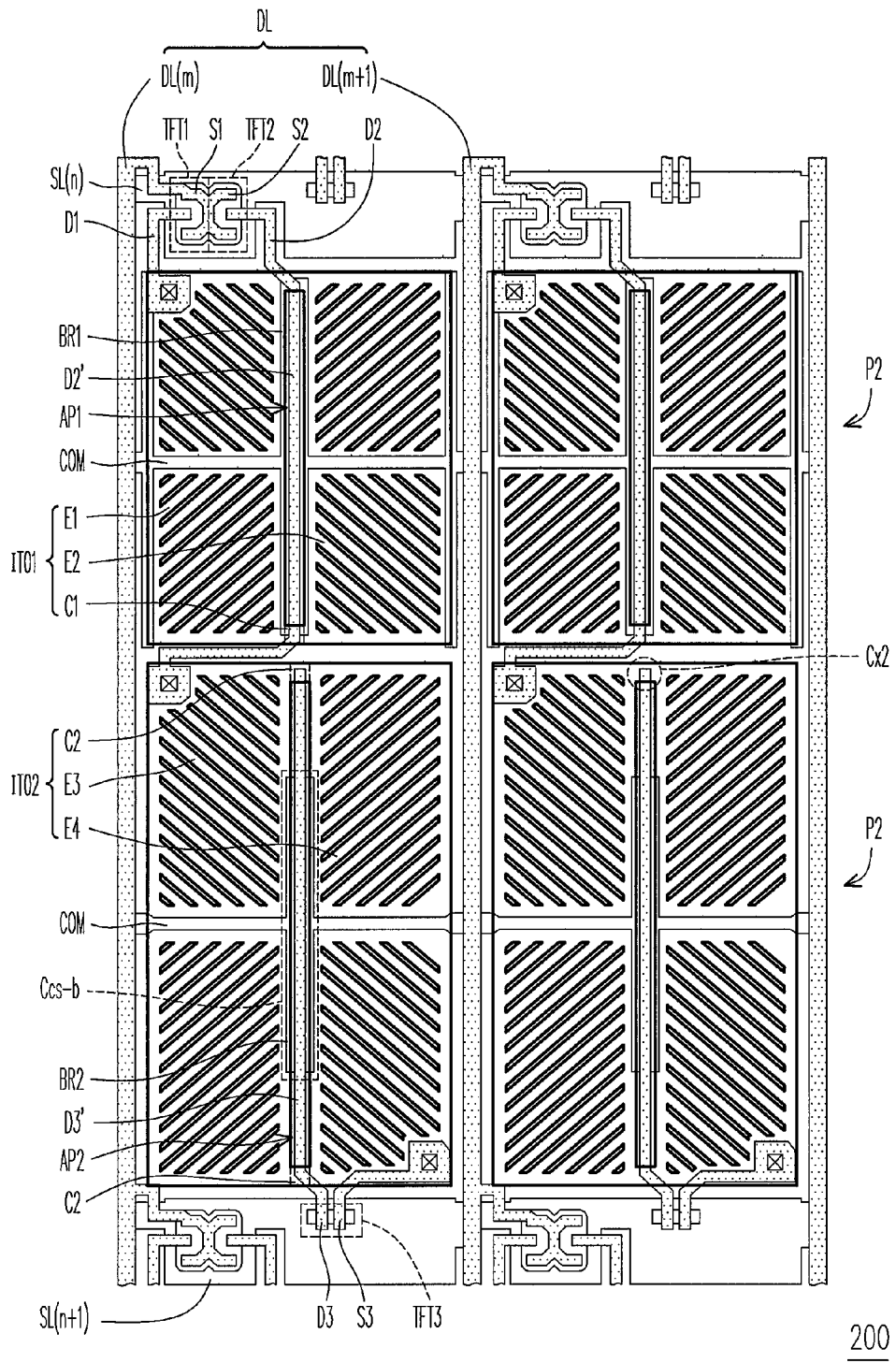

FIG. 3 is a schematic view illustrating a pixel array according to a first embodiment of the invention. FIG. 4 is a schematic view illustrating a layout of a pixel array according to the first embodiment of the invention. As shown in FIG. 3 and FIG. 4, the pixel array 200 of the present embodiment comprises a plurality of scan lines SL (FIG. 3 and FIG. 4 only show scan lines SL(n), SL(n+1) and SL(n+2)), a plurality of data lines DL (FIG. 3 and FIG. 4 only show data lines DL(m), DL(m+1) and DL(m+2)) and a plurality of sub-pixels P2. The data lines DL and the scan lines SL are intersected with one another to define a plurality of sub-pixel regions R. Each of the sub-pixels P2 are located in the sub-pixel regions R respectively. It should be noticed that FIG. 3 and FIG. 4 only show a portion of the sub-pixels P2. Furthermore, the number of the sub-pixels P2 arranged in an array can be varied according to the resolution of the displayed image.

Each of the sub-pixels P2 is electrically connected to one of the scan lines SL and one of the data lines DL. In the present embodiment, the sub-pixels P2 are arranged in a plurality of rows and the sub-pixels P2 arranged in the nth row are electrically connected to the nth scan line SL(n) and the (n+1)th scan line SL(n+1). Specifically, each of the sub-pixels arranged in the nth row comprises a first switch TFT1, a second switch TFT2, a first pixel electrode ITO1, a second pixel electrode ITO2 and a third switch TFT3. The first switch TFT1 and the second switch TFT2 are electrically connected to the nth scan line SL(n) and an mth data line DL(m), and the second switch TFT2 has a signal output terminal D2'. The first pixel electrode ITO1 is electrically connected to the first switch TFT1. The second pixel electrode ITO2 is electrically connected to the signal output terminal D2' of the second switch TFT2 and the first pixel electrode ITO1 has at least a first opening (such as a polygon opening) AP1 located above the signal output terminal D2'. In the present embodiment, the first pixel electrode ITO1 and the second pixel electrode ITO2 of the sub-pixels P2 arranged in the nth row are located between the nth scan line SL(n) and the (n+1)th scan line SL(n+1). Moreover, the third switch TFT3 is electrically connected to the (n+1)th scan line SL(n+1) and the second pixel electrode ITO2. The third switch TFT3 has a floating terminal D3' and the second pixel electrode ITO2 has at least a second opening (such as a polygon opening) AP2 located above the floating terminal D3'.

As shown in FIG. 3 and FIG. 4, each of the first switches TFT1 arranged in the nth row is a first thin film transistor, and the first thin film transistor has a first gate G1, a first source S1 and a first drain D1. The first gate G1 is electrically connected to the nth scan line SL(n) and the first source S1 is electrically connected one of the data lines DL, and the first drain D1 is electrically connected to the first pixel electrode ITO1. Furthermore, each of the second switches TFT2 arranged in the nth row is a second thin film transistor, and the second thin film transistor has a second gate G2, a second source S2 and a second drain D2. The second gate G2 is electrically connected to the nth scan line SL(n), and the second source S2 is electrically connected to one of the data line DL. It should be noticed that the second drain D2 of the second thin film transistor is the aforementioned signal output terminal D2'. Also, each of the third switches TFT3 arranged in the nth row is a third thin film transistor, and the third thin film transistor has a third gate G3, a third source S3 and a third drain D3. The third gate G3 is electrically connected to the (n+1)th scan line SL(n+1), and the third source S3 is electrically connected to the second pixel electrode ITO2. It should be noticed that the third drain D3 of the third thin film transistor is the aforementioned signal output terminal D3'.

As shown in FIG. 4, each of the first pixel electrodes ITO1 comprises a first electrode portion E1, a second electrode portion E2 and a plurality of first connecting portions C1. The first connecting portions C1 are located between the first electrode portion E1 and the second electrode portion E2 so that the first electrode portion E1 and the second electrode portion E2 are separated from each other by at least a first strip opening AP1 located between the first connecting portions C1, wherein the first electrode portion E1 is connected to the second electrode portion E2 through the first connecting portions C1. Furthermore, each of the second pixel electrodes ITO2 comprises a third electrode portion E3, a fourth electrode portion E4 and a plurality of second connecting portions C2. The second connecting portions C2 are located between the third electrode portion E3 and the fourth electrode portion E4 so that the third electrode portion E3 and the fourth electrode portion E4 are separated from each other by at least a second strip opening AP2 located between the second connecting portions C2, wherein the third electrode portion E3 is connected to the fourth electrode portion E4 through the second connecting portions C2. In addition, the present embodiment is not limited to the numbers and the shapes of the first connecting portions C1 and the second connecting portions C2.

In the present embodiment, the first drain D1 is electrically connected to the first electrode portion E1, the signal output terminal D2' extends between the first electrode portion E1 and the second electrode portion E2 and is electrically connected to the third electrode portion E3. More, the source S3 is electrically connected to the fourth electrode portion E4 and the end of the floating terminal D3' extends under the second electrode portion E2 of the first pixel electrode ITO1.

In other words, the floating terminal D3' partially overlaps the first pixel electrode ITO1 so as to form a first capacitor Ccs-a.

For instance, an area of the at least first strip opening AP1 is A1, and a total overlapping area between the first pixel electrode ITO1 and the signal output terminal D2' is A2, and an aperture ratio A1/(A1+A2) is substantially larger than 91%. Moreover, an area of the at least second strip opening AP2 is A3, and a total overlapping area between the second pixel electrode ITO2 and the floating terminal D3' is A4, and an aperture ratio A3/(A3+A4) is substantially larger than 93%.

Since the first pixel electrode ITO1 has the design with the first opening AP1, the total overlapping area between the firs pixel electrode ITO1 and the signal output terminal D2' is greatly decreased due to the first opening AP1. Further, the parasitic capacitance Cx1 between the first pixel electrode ITO1 and the signal output terminal D2' is decreased accordingly. Moreover, since the second pixel electrode ITO2 has the design with the second opening AP2, the total overlapping area between the second pixel electrode ITO2 and the floating terminal D3' is greatly decreased due to the second opening AP2. Further, the parasitic capacitance Cx2 between the second pixel electrode ITO2 and the floating terminal D3' is decreased accordingly. When the parasitic capacitances Cx1 and Cx2 are decreased, the voltage difference between the first pixel electrode ITO1 and the second pixel electrode ITO2 is increased. Thus, the color washout problem can be effectively improved.

According to FIG. 4, the pixel array 200 of the present embodiment further comprises a plurality of common lines COM electrically connected to one another and disposed under each of the first pixel electrodes ITO1 and each of the second pixel electrodes ITO2. Specifically, each of the common lines COM extends along a row direction, and a portion of the common lines COM disposed under the first pixel electrodes ITO1 has at least a first branch BR1 located under the first openings AP1, and a portion of the common lines COM disposed under the second pixel electrodes ITO2 has at least a second branch BR2 located under the second openings AP2. It should be noticed that the second branch BR2 is located below the floating terminal D3'. In other words, the floating terminal D3' partially overlaps the second branch BR2 so as to form a second capacitor Ccs-b.

It is noted that the first capacitor Ccs-a is located under the first pixel electrode ITO1 while the second capacitor Ccs-b is located under the second pixel electrode ITO2. In other words, the first capacitor Ccs-a and the second capacitor Ccs-b of each sub-pixel P2 are not stacked one another. As shown in FIG. 4, the second capacitor Ccs-b is located under a central region of the second pixel electrode ITO2 which is a boundary between domains. Since the boundary between domains is considered as a disclination region, aperture ratio is not significantly affected by the second capacitor Ccs-b located under the central region of the second pixel electrode ITO2. In addition, the area occupied by the first capacitor Ccs-a is usually smaller than the area occupied by the second capacitor Ccs-b, loss of aperture ratio resulted from the first capacitor Ccs-a is limited. In comparison with the conventional design (i.e. the first capacitor and the second capacitor are stacked one another), loss of aperture ratio resulted from the second capacitor Ccs-b is mitigated significantly.

In an alternative embodiment of the present application, the first capacitor Ccs-a formed by the floating terminal D3' and the first pixel electrode ITO1 may be omitted in accordance with design requirements. As shown in FIG. 3' and FIG. 4', the floating terminal D3' only extends under the second pixel electrode ITO2 and does not extend under the first pixel electrode ITO1.

The Second Embodiment

Figure 5:
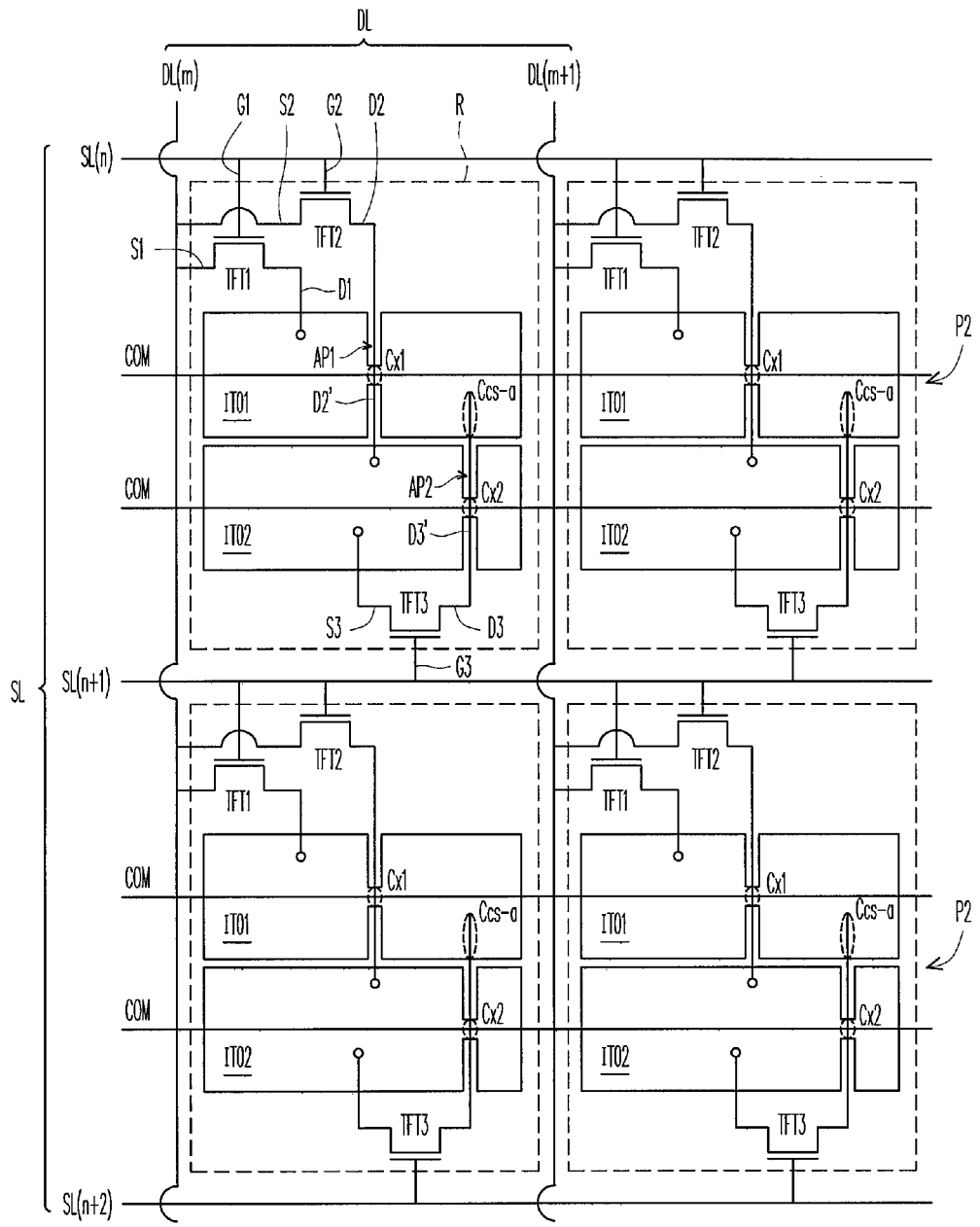
FIG. 5 is a schematic view illustrating a pixel array according to a second embodiment of the invention.
Figure 5:
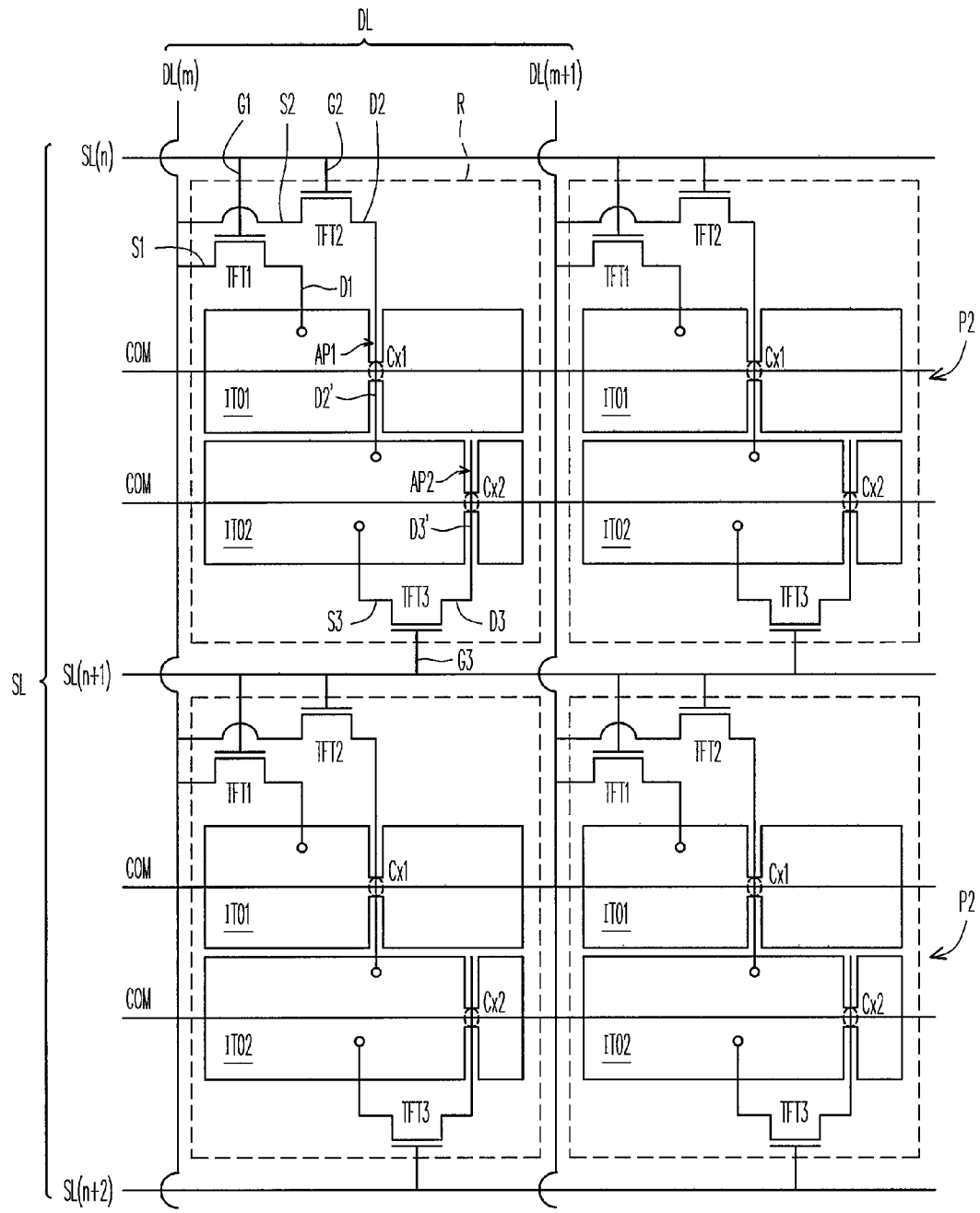
Figure 6:
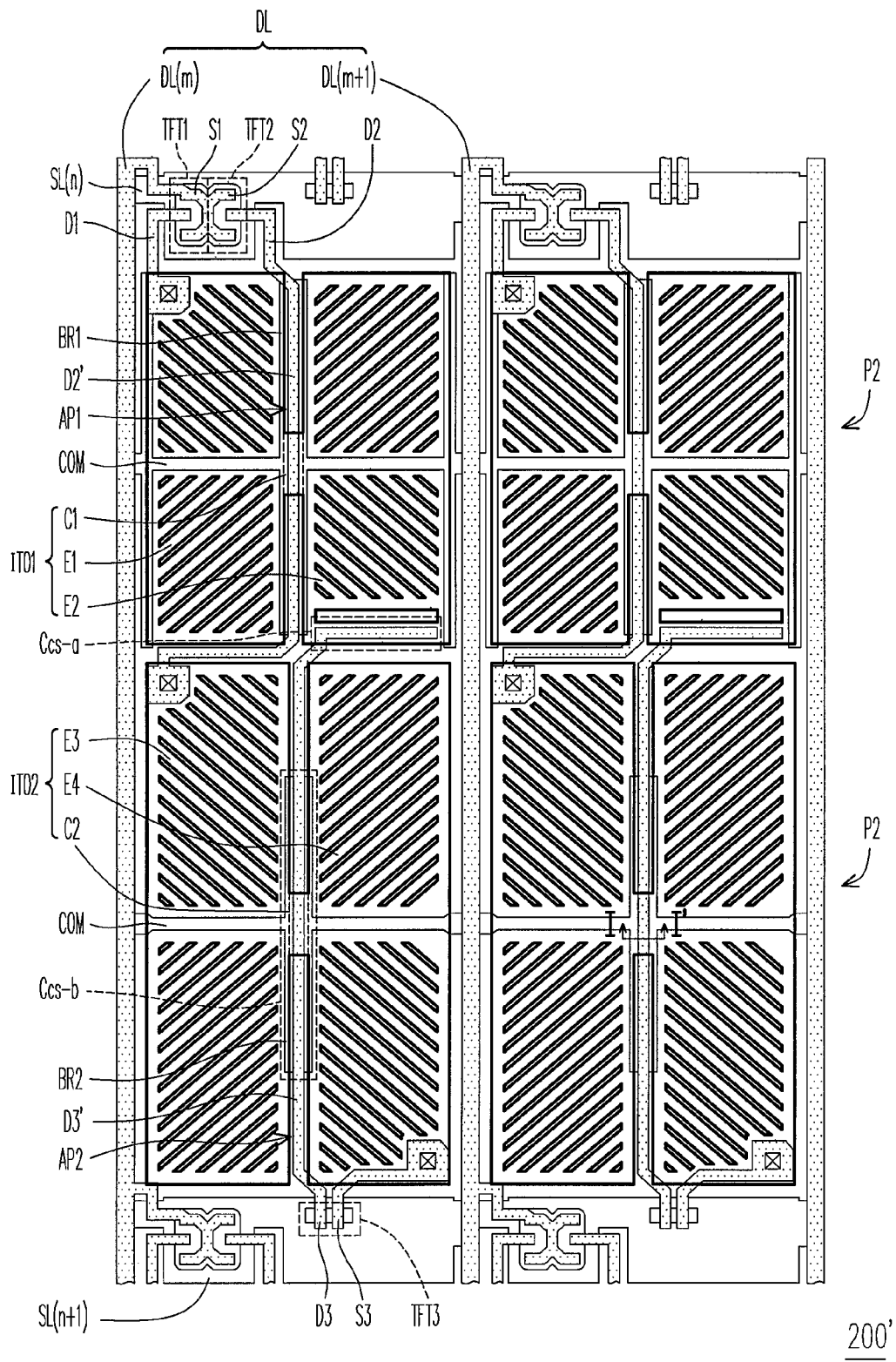
FIG. 6 is a schematic view illustrating a layout of a pixel array according to a second embodiment of the invention.
Figure 6:
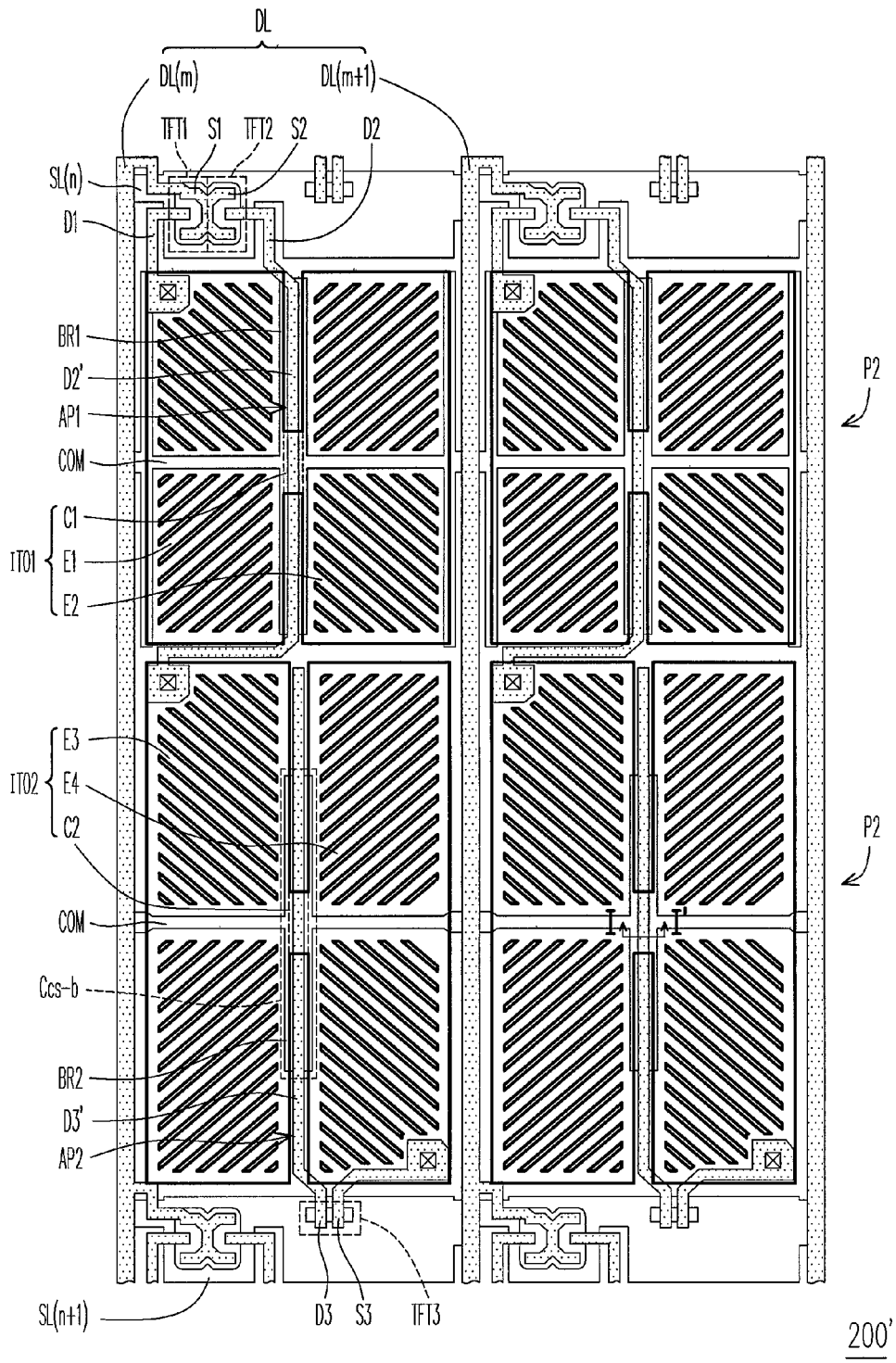
Figure 6A:
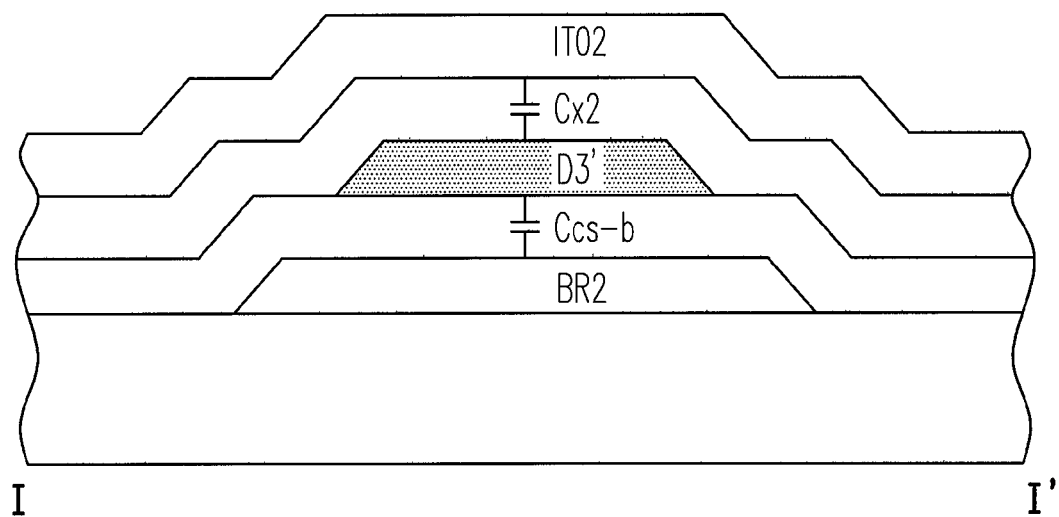
FIG. 6A is a cross-sectional view along the cross-section I-I' shown in FIG. 6.

FIG. 5 is a schematic view illustrating a pixel array according to a second embodiment of the invention. FIG. 6 is a schematic view illustrating a layout of a pixel array according to a second embodiment of the invention. FIG. 6A is a cross-sectional view along the cross-section I-I' shown in FIG. 6. As shown in FIG. 5 and FIG. 6, the pixel array 200' of the present embodiment and the pixel array 200 of the first embodiment are similar to each other except that the patterns of the first pixel electrode ITO1 and second pixel electrode ITO2 of them are different from each other.

According FIG. 5 and FIG. 6, each of the first pixel electrodes ITO1 of the present embodiment includes a first electrode portion E1, a second electrode portion E2 and a first connecting portion C1. The first connecting portion C1 is located between the first electrode portion E1 and the second electrode portion E2 so that the first electrode portion E1 and the second electrode portion E2 are separated from each other by two first strip openings AP1 respectively located at two sides of the first connecting portion C1. Further, the first electrode portion E1 is connected to the second electrode portion E2 through the first connecting portion C1. Furthermore, each of the second pixel electrodes ITO2 comprises a third electrode portion E3, a fourth electrode portion E4 and a second connecting portion C2. The second connecting portion C2 is located between the third electrode portion E3 and the fourth electrode portion E4 so that the third electrode portion E3 and the fourth electrode portion E4 are separated from each other by two second strip openings AP2 respectively located at two sides of the second connecting portion C2. Also, the third electrode portion E3 is connected to the fourth electrode portion E4 through the second connecting portion C2.

For instance, an area of the first strip openings AP1 is A1, and a total overlapping area between the first pixel electrode ITO1 and the signal output terminal D2' is A2, and an aperture ratio A1/(A1+A2) is substantially larger than 91%. Moreover, an area of the second strip opening AP2 is A3, and a total overlapping area between the second pixel electrode ITO2 and the floating terminal D3' is A4, and an aperture ratio A3/(A3+A4) is substantially larger than 93%.

In the pixel array 200' shown in FIG. 5 and FIG. 6, both of the parasitic capacitance Cx1 between the first pixel electrode ITO1 and the signal output terminal D2' and the parasitic capacitance Cx2 (shown in FIG. 6A) between the second pixel electrode ITO2 and the floating terminal D3' can be effectively decreased so that the problem of the color washout can be overcome.

In an alternative embodiment of the present application, the first capacitor Ccs-a formed by the floating terminal D3' and the first pixel electrode ITO1 may be omitted in accordance with design requirements. As shown in FIG. 5' and FIG. 6', the floating terminal D3' only extends under the second pixel electrode ITO2 and does not extend under the first pixel electrode ITO1.

Third Embodiment

Figure 7:
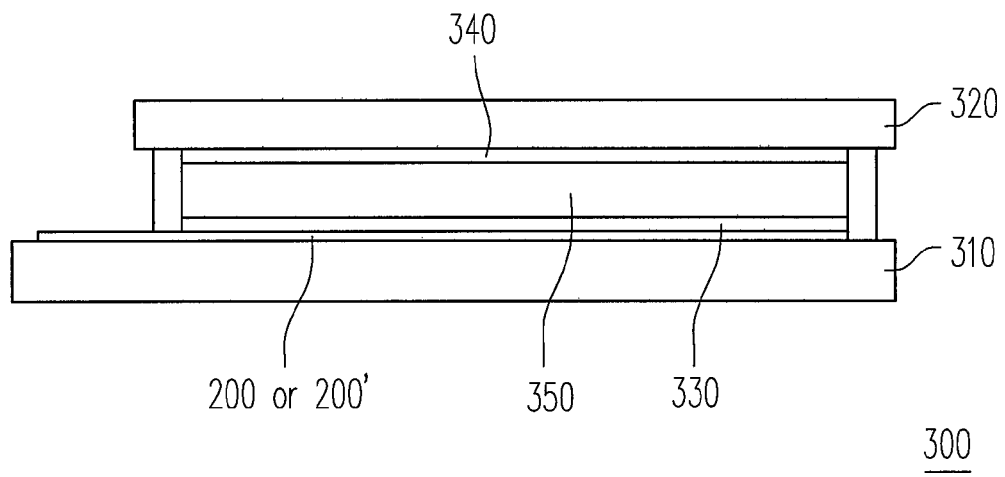
FIG. 7 is a schematic view of a polymer stabilized alignment liquid crystal display panel according to one embodiment of the present invention.

FIG. 7 is a schematic view of a polymer stabilized alignment liquid crystal display panel according to one embodiment of the present invention. As shown in FIG. 7, a polymer stabilized alignment liquid crystal panel 300 of the present embodiment includes a first substrate 310, a second substrate 320, two polymer stabilized alignment layers 330 and 340 and a liquid crystal layer 350. The first substrate 310 has the pixel array (200 or 200') mentioned in the first embodiment or the second embodiment, and the second substrate 320 is disposed above the first substrate 310. Further, the two The two polymer stabilized alignment layers 330 and 340 are respectively disposed on the first substrate and the second substrate. Moreover, the liquid crystal layer 350 is disposed between the two polymer stabilized alignment layers 330 and 340. It should be noticed that the fabrication of the liquid crystal layer 350 is made of the liquid crystal material having monomers capable of being polymerized by the energy source. Hence, when the energy source (such as ultraviolet) is applied onto the liquid crystal layer 350, the monomers capable of being polymerized by the energy source are polymerized on the first substrate 310 and the second substrate 320 respectively to form two polymer stabilized alignment layers 330 and 340.

Figure 8:
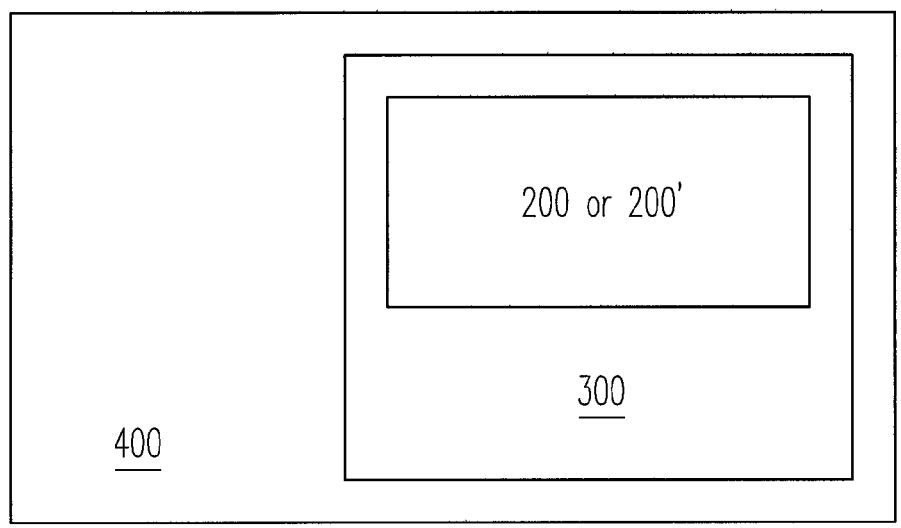
FIG. 8 is a schematic view showing an electro-optical apparatus according to one embodiment of the present invention.

FIG. 8 is a schematic view showing an electro-optical apparatus according to one embodiment of the present invention. As shown in FIG. 8, the present embodiment further provides an electro-optical apparatus 400 including the pixel array (200 or 200') mentioned in the first embodiment or the second embodiment or the polymer stabilized alignment liquid crystal panel 300 shown in FIG. 7. The electro-optical apparatus includes portable products (e.g. mobile phones, camcorders, cameras, laptop computers, game players, watches, music players, e-mail receivers and senders, map navigators, digital photos, or the like), audio-video products (e.g. audio-video players or the like), screens, televisions, bulletins, panels in projectors, and so on.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A pixel array, comprising:
a plurality of scan lines;
a plurality of data lines intersected with the scan lines to define a plurality of sub-pixel regions;
a plurality of sub-pixels disposed in the sub-pixel regions, wherein each of the sub-pixels is electrically connected with one of the scan lines and one of the data lines, and each of the sub-pixels arranged in an nth row comprises:
a first switch;
a second switch, wherein the first switch and the second switch are electrically connected to an nth scan line and an mth data line, and the second switch has a signal output terminal;
a first pixel electrode electrically connected to the first switch;
a second pixel electrode electrically connected to the signal output terminal of the second switch, wherein the first pixel electrode has at least a first opening overlapping the signal output terminal; and
a third switch electrically connected to an (n+1)th scan line and the second pixel electrode, wherein the third switch has a floating terminal and the second pixel electrode has at least a second opening overlapping the floating terminal.

2. The pixel array of claim 1, wherein the sub-pixels are arranged in a plurality of rows and the sub-pixels arranged in the nth row are electrically connected to the nth scan line and the (n+1)th scan line.

3. The pixel array of claim 1, wherein the first pixel electrode and the second pixel electrode of the sub-pixels arranged in the nth row are located between the nth scan line and the (n+1)th scan line.

4. The pixel array of claim 1, wherein each of the first switches arranged in the nth row is a first thin film transistor, and the first thin film transistor has a first gate electrically connect to the nth scan line, a first source electrically connected to one of the data lines, and a first drain electrically connected to the first pixel electrode.

5. The pixel array of claim 1, wherein each of the second switches arranged in the nth row is a second thin film transistor, and the second thin film transistor has a second gate electrically connect to the nth scan line, a second source electrically connected to one of the data lines, and the signal output terminal.

6. The pixel array of claim 1, wherein each of the third switches arranged in the nth row is a third thin film transistor, and the third thin film transistor has a third gate electrically connect to the (n+1)th scan line, a third source electrically connected to the second pixel electrode, and the floating terminal.

7. The pixel array of claim 1, wherein the floating terminal extends below the first pixel electrode.

8. The pixel array of claim 1, further comprising a plurality of common lines electrically connected to one another and disposed under each of the first pixel electrodes and each of the second pixel electrodes.

9. The pixel array of claim 8, wherein each of the common lines extends along a row direction, and a portion of the common lines disposed under the first pixel electrodes has at least a first branch located under the first openings, and a portion of the common lines disposed under the second pixel electrodes has at least a second branch located under the second openings.

10. The pixel array of claim 9, wherein the second branch is located under the floating terminals.

11. The pixel array of claim 10, wherein the floating terminals and the second branch of each sub-pixel are overlapped to form a capacitor.

12. The pixel array of claim 10, wherein the floating terminals and the first pixel electrode of each sub-pixel are overlapped to form a first capacitor while the floating terminals and the second branch of each sub-pixel are overlapped to form a second capacitor.

13. The pixel array of claim 12, wherein the first capacitor and the second capacitor of each sub-pixel are not stacked upon one another.

14. The pixel array of claim 1, wherein each of the first pixel electrodes comprises:
a first electrode portion;
a second electrode portion; and
a first connecting portion located between the first electrode portion and the second electrode portion so that the first electrode portion and the second electrode portion are separated from each other by two first strip openings respectively located at two sides of the first connecting portion, wherein the first electrode portion is connected to the second electrode portion through the first connecting portion.

15. The pixel array of claim 14, wherein a total area of the two first strip openings is A1, and a total overlapping area between the first pixel electrode and the signal output terminal is A2, and an aperture ratio A1/(A1+A2) is substantially larger than 91%.

16. The pixel array of claim 1, wherein each of the second pixel electrodes comprises:

a third electrode portion;

a fourth electrode portion; and a second connecting portion located between the third electrode portion and the fourth electrode portion so that the third electrode portion and the fourth electrode portion are separated from each other by two second strip openings respectively located at two sides of the second connecting portion, wherein the third electrode portion is connected to the fourth electrode portion through the second connecting portion.

17. The pixel array of claim 16, wherein a total area of the two second strip openings is A3, and a total overlapping area between the second pixel electrode and the floating terminal is A4, and an aperture ratio A3/(A3+A4) is substantially larger than 93%.

18. The pixel array of claim 1, wherein each of the first pixel electrodes comprises:

a first electrode portion;

a second electrode portion; and a plurality of first connecting portions located between the first electrode portion and the second electrode portion so that the first electrode portion and the second electrode portion are separated from each other by at least one first strip opening located between the first connecting portions, wherein the first electrode portion is connected to the second electrode portion through the first connecting portions.

19. The pixel array of claim 18, wherein an area of the at least one first strip opening is A1, and a total overlapping area between the first pixel electrode and the signal output terminal is A2, and an aperture ratio A1/(A1+A2) is substantially larger than 91%.

20. The pixel array of claim 1, wherein each of the second pixel electrodes comprises:

a third electrode portion;

a fourth electrode portion; and a plurality of second connecting portions located between the third electrode portion and the fourth electrode portion so that the third electrode portion and the fourth electrode portion are separated from each other by at least one second strip openings located between the second connecting portions, wherein the third electrode portion is connected to the fourth electrode portion through the second connecting portions.

21. The pixel array of claim 20, wherein an area of the at least one second strip opening is A3, and a total overlapping area between the second pixel electrode and the floating terminal is A4, and an aperture ratio A3/(A3+A4) is substantially larger than 93%.

22. A polymer stabilized alignment liquid crystal display panel, comprising:

a first substrate having the pixel array as claimed in claim 1;

a second substrate located above the first substrate;

two polymer stabilized alignment layers respectively disposed on the first substrate and the second substrate; and a liquid crystal layer disposed between the two polymer stabilized alignment layers.

23. An electro-optical apparatus comprising the pixel array as claimed in claim 1.

24. An electro-optical apparatus, comprising the polymer stabilized alignment liquid crystal display panel as claimed in claim 22.

* * * * *